Patented Sept. 5, 1922.

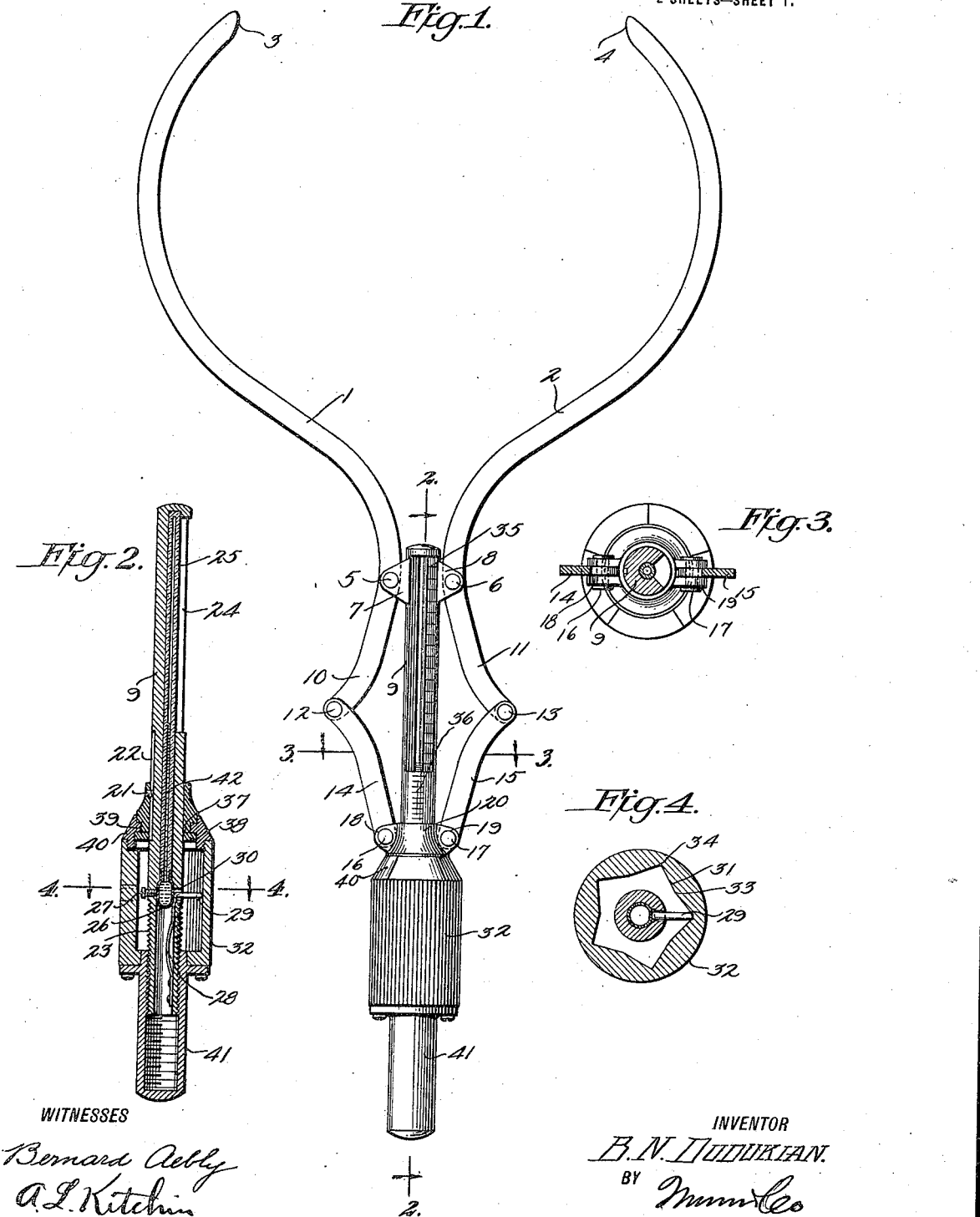

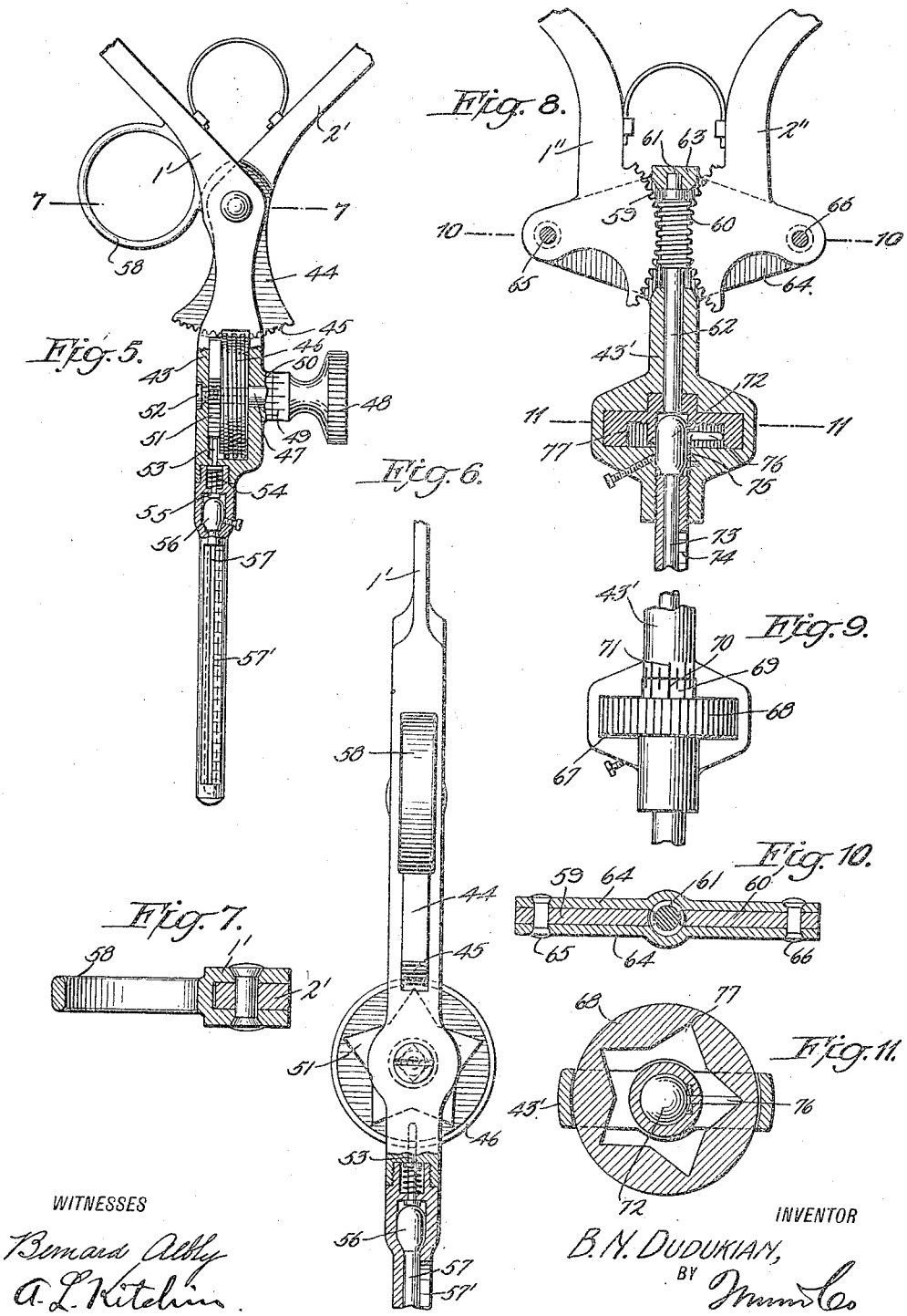

1,428,422

UNITED STATES PATENT OFFICE.

BENJAMIN NAHABED DUDUKIAN, OF SYRACUSE, NEW YORK.

CALIPER.

Application filed March 9, 1920. Serial No. 364,408.

*To all whom it may concern:*

Be it known that I, BENJAMIN NAHABED DUDUKIAN, a citizen of Armenia, and a resident of Syracuse, in the county of Onondaga and State of New York, have invented a new and useful Caliper, of which the following is a full, clear, and exact description.

This invention relates to micrometer calipers, and has for an object to provide a construction and arrangement of parts so as to produce an instrument which may measure several inches.

Another object of the invention is to provide a combined micrometer and caliper formed with means which will permit a quick adjustment of the jaws or arms of the caliper and will at all times show the exact distance therebetween to within a thousandth of an inch, or other distances according to the graduations provided.

A still further object of the invention is to provide a caliper to which a micrometer attachment is secured and arranged to show at all times through the use of a moving column of liquid small fractions of an inch.

In the accompanying drawings:

Figure 1 is a side view of a micrometer caliper disclosing an embodiment of the invention.
Figure 2 is a sectional view through Figure 1 on line 2—2.

Figure 3 is a transverse sectional view through Figure 1 on line 3—3, the same being on an enlarged scale.
Figure 4 is a sectional view through Figure 2 on line 4—4, the same being on an enlarged scale.

Figure 5 is an edge view of a slightly modified form of caliper to that shown in Figure 1, the upper part being broken away and part of the lower part being shown in section for better illustrating the construction.

Figure 6 is an edge view of the construction shown in Figure 5, certain parts being shown in section.

Figure 7 is a fragmentary sectional view through Figure 5 on line 7—7.

Figure 8 is a side view with certain parts broken away of a further modified form of the invention to that shown in Figure 5.

Figure 9 is a detail fragmentary side view of an operating member shown in Figure 8.

Figure 10 is a fragmentary sectional view through Figure 8 on line 10—10.

Figure 11 is a fragmentary sectional view through Figure 8 on line 11—11.

Referring to the accompanying drawings by numerals, 1 and 2 indicate the jaws or arms of the caliper, the operative ends 3 and 4 being designed to be moved through a distance of several inches. These jaws are pivotally mounted at 5 and 6 on suitable ears 7 and 8 secured to or formed integral with a tube 9 hereinafter fully described. The short ends 10 and 11 are pivotally connected at 12 and 13 to the links 14 and 15, which links in turn are pivotally connected at 16 and 17 to the ears 18 and 19 extending from the sleeve 20, which sleeve is loosely mounted on tube 9, but slides thereon by reason of the pin 21 extending through the sleeve 20 and into the slot 22 in tube 9 as shown in Figure 2.

The tube 9 is provided with threads 23 on one end and with a notch 24 extending from the opposite end so as to disclose the glass or other transparent liquid carrying tube 25. This liquid carrying tube 25 is provided with a collapsible bulb 26 of any desired material, said bulb being at the lower end of tube 25 and opposite an adjusting screw 27 as well as opposite the upper end of spring 28, which spring is provided with a stylus 29 extending through an aperture 30 in tube 9. The stylus 29 is designed to be moved longitudinally by reason of the star shaped wall 31 formed on the interior of the barrel 32. As shown in the drawing there are five points to the star shaped wall 31, so that upon one rotation of the barrel 32 the stylus 29 will be depressed five times and the liquid in the bulb 26 and the tube 25 will be moved so that the upper end of the liquid will be substantially at the upper end of the tube 25. It is, of course, understood that when the end of stylus 29 is engaging the apex 33 between the various depressions 34 the upper end of the liquid in the tube 25 is at the highest graduation 35 and when in one of the depressions 34 the liquid will be at the lowest graduation or zero mark of the graduations 35. A second set of graduations 36 is provided on the tube 9 which indicate comparatively large divisions of an inch, while the graduations 35, as shown, indicate thousandths of an inch.

The sleeve 20 is provided with a reduced portion 37, which co-acting with plate 38 forms a groove in which the annular bead

39 of the cone 40 fits, whereby the cone 40 may freely rotate, but is not allowed any loose motion. The plate 38 may be secured in place in any desired manner, as for instance by a number of screws, while the cone 40 is preferably threaded into the barrel 32 as shown in Figure 2. Secured to the end of the barrel 32 opposite that carrying the cone 40 is a thimble 41, which is held in place by any desired means, as for instance by screws, and which is internally threaded so as to screw over the threads 23 of the tube 9. By this construction and arrangement, whenever the thimble 41 is rotated barrel 32 will be rotated, but tube 9 will be held stationary whereupon the tube will be moved at all times into the barrel by the co-action of the threads on the thimble 41 and the threads 23. This will vary the position of the graduations 36 so as to indicate in large divisions the distances between the points 3 and 4 of the jaws 1 and 2. At the same time that the tube 9 is moved longitudinally in respect to the barrel 32 the bulb 26 is being collapsed either once or several times and the liquid 42 is being moved to indicate thousandths of an inch on the graduations 35.

In the drawings a construction is shown in which the graduations 35 indicate thousandths of an inch, but it will be evident that it could indicate other distances, for instance in the drawings a five pointed star wall 31 is provided. If it takes five revolutions of the barrel 32 and the thimble 41 to shift the points 3 and 4 one inch twenty-five graduations on the graduation marks 35 on the tube 9 will indicate thousandths of an inch, the graduations reading both up and down the scale. It is evident that the star-shaped wall 31 could be formed with more or even less points and the graduation marks 35 varied to indicate five hundredths of an inch, two thousandths of an inch, or some other distance. The liquid 42 may be any desired liquid, preferably a colored viscous liquid which will not drop off the tube, as for instance glycerine.

In Figures 5 to 7 inclusive will be seen a modified form of the invention in which the arm 1' is provided with what may be termed a frame or casing 43, while the arm 2' is provided with an extension 44 having a rack 45 at the extreme end. This rack is constructed to co-act with the worm wheel 46, which worm wheel is rigidly secured to the shaft 47 carrying a thumb member 48. Thumb member 48 is provided with graduations 49 co-acting with graduations 50 which are formed on the projection extending from the frame 43. A star wheel 51 is also rigidly secured to the shaft 47 which shaft is held in place by a suitable screw 52. Star wheel 51 is formed with sides resembling the side walls illustrated in Figure 4. This star wheel is formed with ten faces or five points, though a larger or even smaller number could be used without departing from the spirit of the invention. Wheel 51 is positioned to act on the pin 53, which is held against the wheel by a spring 54, said pin having an enlargement or foot 55 bearing against the deflatable container or bag 56. This container is connected with a transparent tube 57 and acts in a similar manner to member 26 so as to cause the liquid therein to move back and forth over the scale 57. In order to more readily hold the instrument while the same is in use a finger hold 58 is formed integral with the arm 1', though it could be made separate and secured thereto if desired.

In Figures 8 to 11 inclusive will be seen a further modified form of the invention to that shown in Figure 5. In this form of the invention the arms 1'' and 2'' are provided with racks 59 and 60 respectively, meshing continually with the worm 61, which is rigidly secured to, or formed integral with shaft 62 journaled in the cross bar 63 and the section of the frame 43'. A pair of side plates 64 are carried by the frame 43' through which the journal members 65 and 66 pass, said journal members being in the form of rivets and passing through the racks 59 and 60 so as to pivotally mount said racks. The frame 43' is provided with an opening 67 which accommodates a thumb wheel 68 and a hub 69 on which graduations 70 are placed, said graduations co-acting with the graduations 71 on the frame 43'. Wheel 68 is substantially hollow interiorly so as to accommodate the upper end of the collapsible bag 72 which extends therein, said bag being connected in any desired manner to the transparent tube 73 so as to cause the fluid in the tube 72 to be forced along the graduations 74 as the device is operated. A spring 75 is connected with the frame 43' and is provided with a pin 76 which engages the walls 77 of the thumb wheel 68 so as to be moved in one direction thereby for collapsing the bag 72, said pin being moved in the opposite direction by spring 75. In Figure 11 a five pointed star shaped opening is shown having ten walls so as to provide ten movements of pin 76 in one revolution of wheel 68.

It will be noted that the same general principle is followed in modified forms shown in Figures 5 and 8 as that shown in Figure 1, but the detail mechanism for shifting the arms of the caliper and for depressing the bulb 72 are slightly different. In the structure shown in Figure 5 a rotation of the thumb member 48 will move the arms 1' and 2' and the degree of movement may be observed by watching the graduations 49 and 50 and also the column of liquid as it moves through the tube 59, said liquid being of the same kind as used in the preferred form of the invention. It will be noted that in this form of the invention only one arm is moved, while in Figure 8 the construction is such that when the thumb member 68 is rotated both arms will be adjusted toward or from a central point and at the same time bulb 72 will be depressed and released alternately while the relation of the graduations 70 and 71 will be changed.

Certain detail features have been described in order to show clearly any embodiment of the invention, and how the inventive idea may be presented if desired, but it is to be understood that the construction presented is merely illustrated and other means may be used for carrying out the same invention.

What I claim is:

1. In a precision instrument of the character described, a pair of arms, means for swinging said arms toward and from each other, and a plurality of means associated with said arms for indicating the distance the ends of the latter are apart at any time, said means including a liquid indicator for indicating thousandths of an inch.

2. A micrometer caliper comprising a pair of pivotally mounted jaws, means for opening and closing said jaws, a scale associated with said jaws for indicating in large divisions the amount of opening of the same, and means including a liquid column continually moving during the movement of said jaws, said means being positioned adjacent said scale and adapted to indicate in fractions of an inch the distance between said jaws.

3. A micrometer caliper of the character described, comprising a tube, a pair of caliper arms pivotally mounted on the tube, said tube being formed with graduations indicating the amount of movement of said arms, means surrounding said tube connected therewith and with said arms for opening and closing said arms, and a liquid gage operated by said means for indicating a movement of said arms through a small distance.

4. In a micrometer caliper a pair of caliper arms, means for moving said arms to an open and closed position, a transparent tube, a collapsible bulb connected with said tube, said tube and bulb being provided with a liquid, and a collapsible member for said bulb actuated by the arm actuating means for collapsing the bulb at spaced intervals as said means is operated.

5. In a micrometer caliper of the character described a pair of arms, a support for carrying said arms, means for pivotally mounting said arms on said support, a rotatable barrel for opening and closing said arms, said barrel moving longitudinally of said support as said arms open and close, said barrel being formed interiorly with a star shaped wall, a transparent gage tube carried by said support, a collapsible bulb arranged at the end of said tube, a liquid arranged in said bulb, and a spring pressed stylus carried by said support opposite said bulb and positioned to be engaged by the star shaped wall of said barrel whereby as the barrel is rotated the bulb will be distended as the stylus enters any point of said star and collapsed as it passes midway between two points.

6. In a micrometer caliper, a pair of caliper arms, means for pivotally connecting said arms together, one end of one of said arms being formed with a frame having an opening therein and the other with a rack, a worm mounted in said frame and positioned to mesh with said rack, a manually controlled member for rotating said worm, a liquid carrying bulb, a transparent tube connected therewith, graduations arranged adjacent said tube, and means for alternately collapsing and releasing said bulb as said worm is rotated.

7. In a micrometer caliper, a pair of caliper arms, means for moving said arms to an open or closed position, a transparent tube, a collapsible bulb connected with said tube, said tube and said bulb being provided with a liquid, a star-shaped collapsing member for said bulb connected with the means for moving said arms whereby whenever said arms are moved said bulb will be collapsed or released for causing said liquid to travel along said tube.

8. In a micrometer caliper of the character described, a pair of arms, means for connecting said arms together, a frame member connected with one of said arms, a rack connected with the other of said arms, a worm wheel carried by said frame member and continually meshing with said rack, means for rotating said worm wheel, and means connected with said worm wheel for indicating thousandths of an inch.

BENJAMIN NAHABED DUDUKIAN.